(12) United States Patent
Wen et al.

(10) Patent No.: US 10,975,696 B2
(45) Date of Patent: Apr. 13, 2021

(54) GROUTING ANCHOR BOLT AND GROUTING ANCHOR CABLE FOR SUPPORTING OF LARGE DEFORMATION AND CONSTANT RESISTANCE AND QUANTITATIVE ROADWAY SUPPORTING METHOD

(71) Applicant: SHANDONG UNIVERSITY OF SCIENCE AND TECHNOLOGY, Qingdao (CN)

(72) Inventors: Zhijie Wen, Qingdao (CN); Shaoshuai Shi, Qingdao (CN); Shengli Yang, Qingdao (CN); Lei Tian, Qingdao (CN); Fanbao Meng, Qingdao (CN); Enrui Xing, Qingdao (CN)

(73) Assignee: SHANDONG UNIVERSITY OF SCIENCE AND TECHNOLOGY, Qingdao (CN)

( * ) Notice: Subject to any disclaimer, the term of this patent is extended or adjusted under 35 U.S.C. 154(b) by 173 days.

(21) Appl. No.: 16/475,561

(22) PCT Filed: Jan. 10, 2018

(86) PCT No.: PCT/CN2018/072171
§ 371 (c)(1),
(2) Date: Jul. 2, 2019

(87) PCT Pub. No.: WO2019/000907
PCT Pub. Date: Jan. 3, 2019

(65) Prior Publication Data
US 2021/0040849 A1 Feb. 11, 2021

(30) Foreign Application Priority Data
Jun. 28, 2017 (CN) .......................... 201710504194.2

(51) Int. Cl.
*E21D 20/00* (2006.01)
*E21D 20/02* (2006.01)
(Continued)

(52) U.S. Cl.
CPC ........... *E21D 20/02* (2013.01); *E21D 21/006* (2016.01); *E21D 21/0033* (2013.01);
(Continued)

(58) Field of Classification Search
CPC ..... E21D 20/02; E21D 20/026; E21D 20/021; E21D 20/023; E21D 20/025;
(Continued)

(56) References Cited

U.S. PATENT DOCUMENTS 4,477,208 A * 10/1984 Scott ..................... E21D 20/026
405/259.6
4,498,817 A * 2/1985 Oulsnam ................. E21D 20/02
405/259.5
(Continued)

FOREIGN PATENT DOCUMENTS

CN 102359386 A 2/2012
CN 102619226 A 8/2012
(Continued)

OTHER PUBLICATIONS

International Search Report issued in corresponding International Application No. PCT/CN2018/072171, dated Apr. 12, 2018; State Intellectual Property Office of the P.R. China, Beijing, China, 8 pgs.
(Continued)

*Primary Examiner* — Benjamin F Fiorello
(74) *Attorney, Agent, or Firm* — Hauptman Ham, LLP

(57) ABSTRACT

Provided are a grouting anchor bolt and a grouting anchor cable for supporting of large deformation and constant resistance and a quantitative roadway supporting method,
(Continued)

wherein an anchor bolt comprises a casing, a hollow rod body, an anchor cylinder, a tray, a fastening nut and a clamping pin, a front end of the casing is sealed and a rear end of the casing is opened, a middle position of the casing is provided with a plurality of grouting holes, an inner diameter of the casing from the middle position of the casing to the rear end becomes small gradually, a side surface of a front end of the hollow rod body is sleeved with an anchor cylinder, the anchor cylinder is inserted into the casing and movably connected with the casing, the anchor cylinder is connected with the casing through the clamping pin, a rear end of the hollow rod body is sequentially assembled and connected with the tray and the fastening nut. The beneficial effects herein are as follows: the anchor bolt and the anchor cable simple in structure, easy to process, simplifies operations of supporting and grouting, and therefore particularly suitable for supporting of large deformation for surrounding rocks. The self-bearing capability of surrounding rocks is improved, and the supporting of large deformation of surrounding rocks is provided through constant resistance, thereby realizing organic combination of "yielding-supporting" and "active-passive supporting"; the quantitative roadway supporting method may realize quantitative supporting for a roadway.

7 Claims, 3 Drawing Sheets

(51) Int. Cl.
*E21D 21/00* (2006.01)
*G06F 30/20* (2020.01)
*G06F 111/10* (2020.01)

(52) U.S. Cl.
CPC ............ *G06F 30/20* (2020.01); *E21D 20/026* (2013.01); *G06F 2111/10* (2020.01)

(58) Field of Classification Search
CPC ... E21D 21/006; E21D 21/0033; E21D 21/00; E21D 21/0026; E21D 21/008; E21D 21/0093
See application file for complete search history.

(56) References Cited

U.S. PATENT DOCUMENTS

| | | | | |
|---|---|---|---|---|
| 4,576,524 | A * | 3/1986 | Heintzmann | ....... E21D 21/0026 405/259.5 |
| 5,085,026 | A * | 2/1992 | McGill | ............... B23B 51/0081 411/55 |
| 8,137,032 | B2 * | 3/2012 | Grocholewski | ......... E21D 20/02 405/259.5 |
| 2008/0247828 | A1 * | 10/2008 | Craig | ..................... D07B 7/187 405/259.1 |
| 2011/0311315 | A1 * | 12/2011 | Evans | ................... E21D 21/004 405/259.3 |
| 2016/0138397 | A1 * | 5/2016 | Ma | ...................... E21D 21/0033 405/259.1 |
| 2019/0017241 | A1 * | 1/2019 | Kim | ..................... E21D 21/0026 |
| 2019/0277138 | A1 * | 9/2019 | Roberts | ................... E21D 21/00 |

FOREIGN PATENT DOCUMENTS

| | | |
|---|---|---|
| CN | 202360120 U | 8/2012 |
| CN | 205422770 U | 8/2016 |
| CN | 107237646 A | 10/2017 |
| WO | 2019000907 A1 | 1/2019 |

OTHER PUBLICATIONS

Written Opinion issued in corresponding International Application No. PCT/CN2018/072171, dated Apr. 12, 2018; State Intellectual Property Office of the P.R. China, Beijing, China, 9 pgs.
First Office Action issued in corresponding Chinese Patent Application No. 201710504194.2; dated Apr. 11, 2018; 11 pgs.
Chinese Search Report issued in corresponding Chinese Patent Application No. 201710504194.2; dated Apr. 2, 2018; 3 pgs.
Second Office Action issued in corresponding Chinese Patent Application No. 201710504194.2; dated Jul. 27, 2018; 13 pgs.
Third Office Action issued in corresponding Chinese Patent Application No. 201710504194.2; dated Oct. 25, 2018; 9 pgs.
Notice to Grant issued in corresponding Chinese Patent Application No. 201710504194.2; dated Jan. 22, 2019; 5 pgs.

* cited by examiner

GROUTING ANCHOR BOLT AND GROUTING ANCHOR CABLE FOR SUPPORTING OF LARGE DEFORMATION AND CONSTANT RESISTANCE AND QUANTITATIVE ROADWAY SUPPORTING METHOD

RELATED APPLICATIONS

The present application is a National Phase of International Application Number PCT/CN2018/072171, filed Jan. 10, 2018, which claims priority to Chinese Patent Application No. 201710504194.2, filed Jun. 28, 2017.

TECHNICAL FIELD

The present disclosure relates to the field of large-deformation supporting technology for surrounding rocks of underground engineering, and in particular to a grouting anchor bolt and a grouting anchor cable for supporting of large deformation and constant resistance and a quantitative roadway supporting method.

BACKGROUND

During construction of underground engineering, anchor bolts and anchor cables are one of supporting devices that are applied most widely in the largest quantity. At present, different anchor bolts and anchor cables are used in a large quantity for supporting of mine roadways, supporting of roads and tunnels, supporting of water conservation culverts, reinforcement of hill bodies, and reinforcement of construction pile foundations and so on and achieve a good reinforcement effect for the surrounding rocks, thereby increasing strengths that the surrounding rocks themselves bear a pressure, which is a very good active supporting type. However, with increasing depletion of shallow mineral resources, the mineral resource mining is developing deeper and deeper. Under a deep mining condition, a high ground pressure, a high ground temperature, a high osmotic pressure and a mining disturbance all bring severe impacts to the stability of surrounding rocks in an underground roadway. Since a traditional small-deformation anchor bolt usually allows a deformation amount of surrounding rocks of roadway to be below 200 mm, the traditional supporting technology cannot adapt to non-linear large-deformation destruction features of surrounding rocks of a deep roadway, frequently resulting in ineffectiveness of an anchor bolt caused by breakage due to its inability to adapt to the large-deformation destruction of surrounding rocks of roadway. Thus, a pressure bump also occurs at a noticeably increasing frequency. Different energy-absorbing anchor bolts appear in the market, but these anchor bolts are poor in roadway self-bearing capability and stability and therefore cannot be effectively matched with current large-deformation roadways.

A Chinese patent document with a publication number CN102434179B discloses a continuous resistance-increasing deforming anchor cable, including a friction casing, where an inner diameter of the friction casing becomes small gradually from one end of the casing to the other; a yieldable member, where the yieldable member is of a tubular structure and inserted into the friction casing, an outer diameter of the yieldable member becomes gradually small from one end of the member to the other, and an outer wall of the yieldable member is in contact with an inner wall of the friction casing; and a first fixed pull cable, where one end of the first fixed pull cable is connected with the yieldable member, and the first fixed pull cable is led out from a side of a tube mouth end that is on the friction casing and has a small inner diameter. This technical solution may achieve large-deformation supporting for the surrounding rocks. However, the anchor cable may be broken and disabled due to an increasing supporting resistance, grouting cannot be achieved to change an internal loose structure of surrounding rocks and improve self-bearing capability of the surrounding rocks, and parts of the anchor cables also cannot be recovered, resulting in high costs.

A Chinese patent document with a publication number CN104612732B discloses a new hollow grouting anchor bolt with a multi-level inverse branch, including a steel strand rod body, where one end of the steel strand rod body is connected with one connecting rod through a first connecting sleeve and the other end is connected with an anchorage section through a second connecting sleeve, inner diameters of the steel strand rod body, the connecting rod and the anchorage section are all consistent, the steel strand rod body is inserted into the first and second connecting sleeves by using a hydraulic extruder through extrusion, a surface of the connecting rod is provided with an external thread and the connecting rod is thread-connected with the first connecting sleeve; a surface of the anchorage section is provided with an external thread to be thread-connected with the second connecting sleeve, and both ends of the steel strand rod body are thread-connected with the anchorage section and the connecting rod respectively through the first and second connecting sleeves so that the entire anchor bolt can be detachably combined to adapt to different lengths. This solution can achieve soft rock grouting but its anchor bolt body can only be subjected to small deformation. Thus, an effect of the anchor bolt applied to large deformation supporting of surrounding rocks is still in question, and also parts of the anchor bolt cannot be recovered, resulting in high costs.

SUMMARY

The subject of the present disclosure is to provide a grouting anchor bolt and a grouting anchor cable for supporting of large deformation and constant resistance and a quantitative roadway supporting method to realize quantitative supporting of large deformation for surrounding rocks and improve a supporting effect.

The present disclosure provides a grouting anchor bolt for supporting of large deformation and constant resistance, including a casing, a hollow rod body, an anchor cylinder, a tray, a fastening nut and a clamping pin, where a front end of the casing is sealed, a rear end of the casing is opened, a plurality of grouting holes are opened in a middle position of the casing, an inner diameter of the casing from the middle position of the casing to the rear end becomes small gradually, a side surface of a front end of the hollow rod body is sleeved with the anchor cylinder, the anchor cylinder is inserted into the casing and moveably connected with the casing, the anchor cylinder is connected with the casing through the clamping pin, and a rear end of the hollow rod body is sequentially assembled and connected with the tray and the fastening nut.

Further, an inner wall from the middle position of the casing to the rear end is provided with a fine thread.

Further, a front end of the hollow rod body is detachably connected with the anchor cylinder.

Further, a front end thread of the hollow rod body is connected with the anchor cylinder.

Further, the front end of the casing is detachably provided with a baffle for sealing.

The present disclosure also provides a grouting anchor cable for supporting of large deformation and constant resistance, including a casing, a steel cable, an anchor cylinder, a tray, a fastening nut and a clamping pin, where a front end of the casing is sealed, a rear end of the casing is opened, a plurality of grouting holes are opened in a middle position of the casing, an inner diameter of the casing from the middle position of the casing to the rear end becomes small gradually, the steel cable is internally inserted with a hollow hose, a side surface of a front end of the steel cable is sleeved with the anchor cylinder, the anchor cylinder is inserted into the casing and moveably connected with the casing, the anchor cylinder is connected with the casing through the clamping pin, and a rear end of the steel cable is sequentially assembled and connected with the tray and the fastening nut.

Further, an inner wall from the middle position of the casing to the rear end is provided with a fine thread.

Further, a front end of the casing is detachably provided with a baffle for sealing.

Further, the steel cable is formed by surrounding the hollow hose with a plurality of steel strands through weaving.

The present disclosure also provides a quantitative roadway supporting method applied to the above grouting anchor bolt for supporting of large deformation and constant resistance and the above grouting anchor cable for supporting of large deformation and constant resistance, including the following steps:

at step 1, performing numerical simulation for a geological condition of a roadway, performing calculation analysis for a mining-induced stress distribution of surrounding rocks of roadway through the numerical simulation, drawing a mining-induced stress curve of roadway to obtain a roadway deformation amount $\Delta U$, performing quantitative determination for a length of an energy-absorbing region of the casing based on the roadway deformation amount $\Delta U$ no less than the length of the energy-absorbing region of the casing;

at step 2, selecting key points including a roadway wall 0, a virgin rock stress point a, a stress peak value b, a starting point d of a virgin rock stress according to the mining-induced stress curve of roadway and a virgin rock stress line of rock stratum, and continuing to subdivide other key points including ½ position e of an 0a curve, ½ position f of an ab curve, and ½ position c of a db curve at the same time;

at step 3, allowing anchoring points of the grouting anchor bolt for supporting of large deformation and constant resistance or the grouting anchor cable for supporting of large deformation and constant resistance to be located at different key points based on the key points determined at step 2, so that a supporting length L of the grouting anchor bolt for supporting of large deformation and constant resistance or the grouting anchor cable for supporting of large deformation and constant resistance is determined, where the supporting length L is a distance between a key point and a roadway wall; performing calculation analysis for a maintenance effect of the roadway under different supporting lengths L based on numerical simulation to determine an optimal supporting length L;

at step 4, designing several groups of intervals of anchor bolts or anchor cables according to lithology of surrounding rocks of roadway and stipulations of a reinforced arch principle for an interval l≤0.5 L of anchor bolts or anchor cables and with reference to supporting experiences, and performing calculation analysis for a maintenance effect of roadways with different intervals through numerical simulation to determine an optimal supporting interval; and at step 5, calculating a change curve of a deformation amount U of a roof, a floor, two sides of roadway after supporting along with an equivalent plastic strain through numerical simulation based on the lithology of surrounding rocks of roadway and the optimal supporting interval obtained at step 4, and determining quantification of a grouting time for the grouting anchor bolt for supporting of large deformation and constant resistance or the grouting anchor cable for supporting of large deformation and constant resistance after supporting according to the fact that an interval of a deformation amount of the roof, the floor, and the two sides of roadway is the optimal grouting and supporting time of roadway indicated by the deformation amount of roadway when a maximum equivalent plastic strain $\varepsilon^{ps}$ of the surrounding rocks is located at the stage of $0.05 \le \varepsilon^{ps} \le 0.10$.

Compared with the prior art, the grouting anchor bolt and the grouting anchor cable for supporting of large deformation and constant resistance and the quantitative roadway supporting method provided in the present disclosure have the following features and advantages.

The grouting anchor bolt and the grouting anchor cable for supporting of large deformation and constant resistance in the present disclosure are simple in structure and easy to process, and simplify operations of supporting and grouting and therefore particularly suitable for supporting of large deformation for surrounding rocks, where the internal loose structure of surrounding rocks can be changed by grouting to improve self-bearing capability of surrounding rocks and supporting of large deformation for surrounding rocks is provided by constant resistance, so that organic combination of "yielding-supporting" and "active and passive supporting" is achieved.

The quantitative roadway supporting method of the present disclosure is applied to the grouting anchor bolt for supporting of large deformation and constant resistance or the grouting anchor cable for supporting of large deformation and constant resistance to quantitatively determine the length of the energy-absorbing region of the casing, the supporting length L of the anchor bolt or the anchor cable, the supporting interval of anchor bolts or anchor cables, and the after-supporting grouting time, thereby achieving quantitative supporting for roadway.

After reading the specific examples of the present disclosure in combination with accompanying drawings, the features and advantages of the present disclosure will become more apparent.

BRIEF DESCRIPTION OF THE DRAWINGS

To describe the technical solutions of the examples of the present disclosure or the prior art more clearly, the accompanying drawings required for the descriptions of the examples or the prior art will be briefly introduced below. It is apparent that the drawings described below are merely some examples of the present disclosure, and those skilled in the art may obtain other drawings based on these drawings without paying creative labor.

Figure 1:
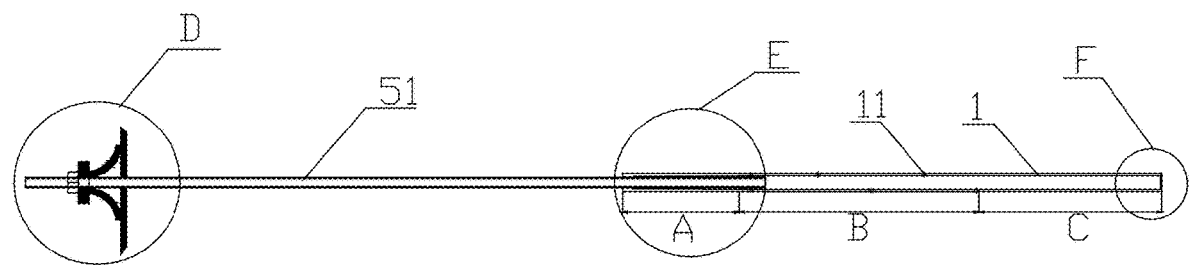
FIG. 1 is a schematic diagram illustrating a structure of a grouting anchor bolt for supporting of large deformation and constant resistance according to an example 1 of the present disclosure.
Figure 2:
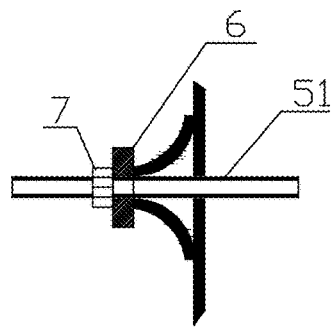
FIG. 2 is a partially enlarged view of position D of FIG. 1.
Figure 3:
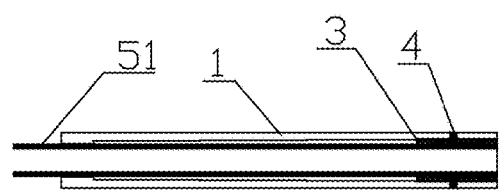
FIG. 3 is a partially enlarged view of position E of FIG. 1.
Figure 4:
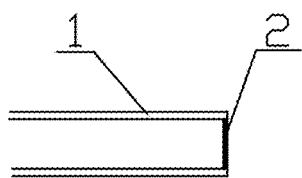
FIG. 4 is a partially enlarged view of position F of FIG. 1.

In the drawings, 1 refers to a casing, 11 refers to a grouting hole, 2 refers to a baffle, 3 refers to an anchor cylinder, 4 refers to a clamping pin, 51 refers to a hollow rod body, 52 refers to a steel cable, 6 refers to a tray, 7 refers to a fastening nut, A refers to an energy-absorbing region, B refers to a grouting region, and C refers to an anchoring region.

DETAILED DESCRIPTION OF THE EMBODIMENTS

Example 1

As shown in FIG. 1-FIG. 5, an example of the present disclosure provides a grouting anchor bolt for supporting of large deformation and constant resistance, including a casing 1, a hollow rod body 51, a anchor cylinder 3, a tray 6, a fastening nut 7 and a clamping pin 4 and so on. A front end of the casing 1 is detachably provided with a baffle 2 for sealing, so that the casing 1 and the hollow rod body 51 can be assembled during construction to reduce a product volume of the grouting anchor bolt for supporting of large deformation and constant resistance, facilitating storage and transportation. Thus, it is particularly suitable for construction of underground engineering. A rear end of the casing 1 is open, a middle position (a grouting region B) of the casing 1 is provided with a plurality of grouting holes 11, an inner diameter an energy-absorbing region A from the middle position of the casing 1 to a rear end becomes small gradually, and an inner wall of the energy-absorbing region A from the middle position of the casing 1 to the rear end casing 1 is provided with a fine thread. A side surface of a front end of the hollow rod body 51 is provided with an external thread, the anchor cylinder is internally provided with an internal thread, and the side surface of the front end of the hollow rod body 51 is thread-connected with the anchor cylinder 3 to realize detachable connection of the hollow rod body 51 and the anchor cylinder 3. The anchor cylinder 3 is inserted into the casing 1 and moveably connected with the casing 1, the anchor cylinder 3 is connected with the casing 1 through the clamping pin 4 and the rear end of the hollow rod body 51 is sequentially assembled and connected with the tray 6 and the fastening nut 7.

The grouting anchor bolt for supporting of large deformation and constant resistance may be implemented in the following construction, supporting and grouting processes:

(1) An anchor hole of a particular preferred depth value (performing quantitative analysis based on actual situations) is drilled at a specified position of a roadway wall, where the anchor hole has a diameter of about 40 mm and is blown with high pressure air to remove rock powder in the hole.

(2) A resin capsule is delivered to the bottom of the anchor hole and held by the casing 1, the hollow rod body 51 is driven by an anchor bolt drilling machine to rotate in a thread tightening direction at the same time, and the hollow rod body 51 rotates to drive the anchor cylinder 3 to rotate. Since the anchor cylinder 3 and the casing 1 are connected with the clamping pin 4, the anchor cylinder 3 can drive the casing 1 to rotate. With rotation of the casing 1, the resin capsule is in full contact with a front end (an anchoring region C) of the casing 1. The baffle 2 at the front end of the casing 1 prevents the resin capsule from entering the casing 1.

(3) The anchor bolt drilling machine is disassembled. After a waiting time of the resin capsule is reached, a mixing connector is disassembled. The hollow rod body 51 is assembled with the tray 6, a ball washer, a friction washer, and the fastening nut 7 to allow the anchor bolt to be pre-tightened with the roadway wall. The clamping pin 4 is broken when subjected to the mining-induced stress.

Figure 5:
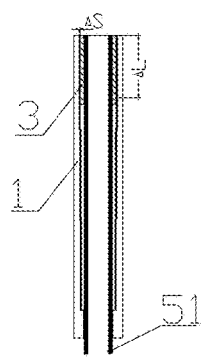
FIG. 5 is a schematic diagram illustrating an energy-absorbing structure of a grouting anchor bolt for supporting of large deformation and constant resistance according to an example 1 of the present disclosure.
Figure 6:
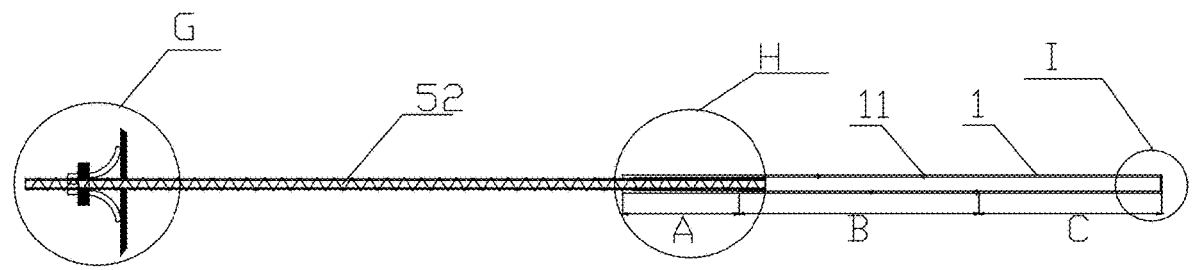
FIG. 6 is a schematic diagram illustrating a structure of a grouting anchor cable for supporting of large deformation and constant resistance according to an example 2 of the present disclosure.
Figure 7:
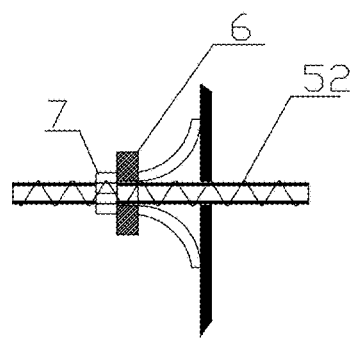
FIG. 7 is a partially enlarged view of position G of FIG. 6.
Figure 8:
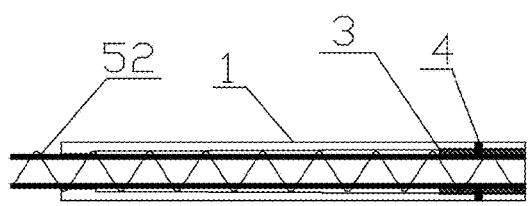
FIG. 8 is a partially enlarged view of position H of FIG. 6.
Figure 9:
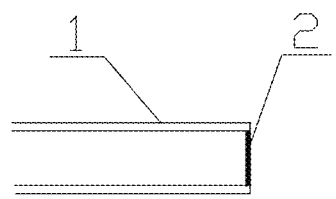
FIG. 9 is a partially enlarged view of position I of FIG. 6.
Figure 10:
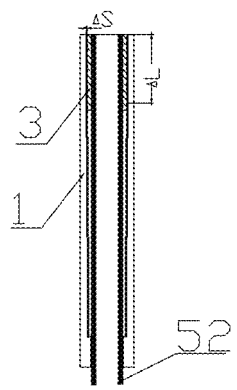
FIG. 10 is a schematic diagram illustrating an energy-absorbing structure of a grouting anchor cable for supporting of large deformation and constant resistance according to an example 2 of the present disclosure.

(4) The surrounding rocks of roadway are subjected to large deformation under the action of the mining-induced stress. The roadway wall squeezes the tray 6 to transmit a pull force to the hollow rod body 51 to allow the anchor cylinder 3 and the casing 1 to be subjected to relative displacement so that the anchor cylinder 3 enters the energy-absorbing region A from the middle position of the casing 1 to the rear end and, at same time, the energy-absorbing region from the middle position of the casing 1 to the rear end is subjected to tiny elastic deformation expressed as radial expansion to facilitate the relative displacement of the anchor cylinder 3 and the casing 1. During the relative displacement of the anchor cylinder 3 and the casing 1, the casing 1 and the anchor bolt 3 still keep constant resistance. When an external axial pull force is less than a frictional force between the casing 1 and the anchor cylinder 3, the casing 1 and the anchor cylinder 3 will not be subjected to relative displacement any longer but will remain in a stationary state. The energy-absorbing region A from the middle position of the casing 1 to the rear end keeps elastic deformation and is tightly sleeved on the anchor cylinder 3. During the above process, since the deformation can provide a constant force and also may generate a constant frictional resistance, an effect of absorbing energy with constant resistance can be achieved. Thus, as shown in FIG. 5, an energy-absorbing formula may be obtained as follows: $Q = u \times K \times \Delta S \times \Delta L$ where Q refers to an energy generated by friction, u refers to a friction coefficient of the inner wall of the energy-absorbing region A of the casing 1, K refers to an elastic modulus of the casing 1, $\Delta S$ refers to an average deformation amount of the casing 1, and $\Delta L$ refers to a displacement amount of the anchor cylinder 3 and the hollow rod body 51. In this case, the grouting anchor bolt for supporting of large deformation and constant resistance may realize quantitative supporting.

(5) during a supporting process, when surrounding rocks in the roadway wall are broken and require grouting and supporting, an operator may insert a grouting pipe into the hollow rod body 51 communicating with the casing 1, grout may be injected into the broken surrounding rocks through the grouting holes 11 of the casing 1 from the hollow rod body 51, and the grout will flow into fractures along a fracture strike of rocks to further spread with an spreading range being about 2 m. In this case, the bearing capability, the cohesion and the tensile strength of the surrounding rocks can be improved, thereby preventing and controlling a large area of side falling and roof collapse.

(6) when it is desired to recover the hollow rod body 51, the hollow rod body 51 may be rotated in a thread-untightening direction to separate the hollow rod body 51 from the anchor cylinder 3 so as to realize recovery of the hollow rod body 51. Also, the tray 6 and the fastening nut and so on may be recovered to realize recycling of the parts and save resources.

The grouting anchor bolt for supporting of large deformation and constant resistance in the example is simple in structure, easy to process and simplifies operations of supporting and grouting and requires no grouting plug for sealing, simplifying the working procedures. The grouting anchor bolt for supporting of large deformation and constant resistance in the example is particularly suitable for supporting of large deformation for surrounding rocks. The internal loose structure of the surrounding rocks is changed by grouting to improve the self-bearing capability of the surrounding rocks, and thus organic combination of "yielding-supporting" and "active and passive supporting" is achieved.

Figure 11:
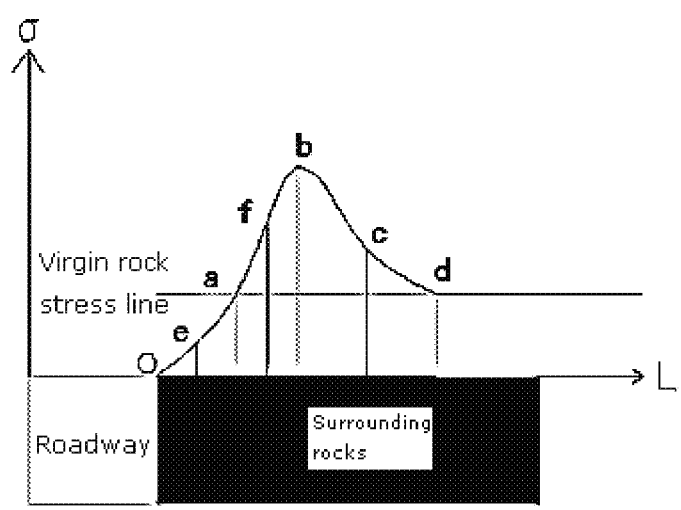
FIG. 11 is a schematic diagram illustrating a mining-induced stress curve of roadway and a virgin rock stress line of rock stratum.

An example of the present disclosure also provides a quantitative roadway supporting method being applied to a grouting anchor bolt for supporting of large deformation and constant resistance. The method may include the following steps:

at step 1, performing numerical simulation for a geological condition of a roadway, performing calculation analysis for a mining-induced stress distribution of surrounding rocks of roadway through the numerical simulation, drawing a mining-induced stress curve of roadway to obtain a roadway deformation amount Δ U, performing quantitative determination for a length of an energy-absorbing region A of the casing 1 based on the roadway deformation amount Δ U no less than the length of the energy-absorbing region A of the casing 1, and the length of the energy-absorbing region A of the casing 1 being a length from the middle position of the casing 1 to the rear end;

at step 2, as shown in FIG. 11, selecting key points including a roadway wall 0, a virgin rock stress point a, a stress peak value b, a starting point d of a virgin rock stress according to the mining-induced stress curve of roadway and a virgin rock stress line of rock stratum, and continuing to subdivide other key points including ½ position e of an 0a curve, ½ position f of an ab curve, and ½ position c of a db curve at the same time;

at step 3, allowing anchoring points of the grouting anchor bolt for supporting of large deformation and constant resistance to be located at different key points based on the key points determined at step 2, so that a supporting length L of the grouting anchor bolt for supporting of large deformation and constant resistance is determined, where the supporting length L is a distance between a key point and a roadway wall; performing calculation analysis for a maintenance effect of the roadway under different supporting lengths L based on numerical simulation to determine an optimal supporting length L;

at step 4, designing several groups of intervals of anchor bolts according to lithology of surrounding rocks of roadway and stipulations of a reinforced arch principle for an interval l≤0.5 L of anchor bolts and with reference to supporting experiences, and performing calculation analysis for a maintenance effect of roadways with different intervals through numerical simulation to determine an optimal supporting interval; and at step 5, calculating a change curve of a deformation amount U of a roof, a floor, two sides of roadway after supporting along with an equivalent plastic strain through numerical simulation based on the lithology of surrounding rocks of roadway and the optimal supporting interval obtained at step 4, and determining quantification of a grouting time for the grouting anchor bolt for supporting of large deformation and constant resistance after supporting according to the fact that an interval of a deformation amount of the roof, the floor, and the two sides of roadway is an optimal grouting and supporting time of roadway indicated by the deformation amount of roadway when a maximum equivalent plastic strain $\varepsilon^{ps}$ of the surrounding rocks is located at the stage of $0.05 \leq \varepsilon^{ps} \leq 0.10$.

The quantitative roadway supporting method of the present disclosure is applied to the grouting anchor bolt for supporting of large deformation and constant resistance to quantitatively determine the length of the energy-absorbing region of the casing 1, the supporting length L of the anchor bolt, the supporting interval of anchor bolts, and the after-supporting grouting time, thereby achieving quantitative supporting for roadway.

Example 2

As shown in FIGS. 6-10, an example of the present disclosure also provides a grouting anchor cable for supporting of large deformation and constant resistance, which differs from the example 1 in that the steel cable 52 substitutes the hollow rod body 51, where the steel cable 52 is formed by surrounding a hollow hose 52 with a plurality of steel strands through weaving, and a side surface of a front end of the steel cable 52 is welded with the anchor cylinder 3. The grout is injected into the broken surrounding rocks through the grouting holes 11 on the casing 1 from the hollow hose 52.

The grouting anchor cable for supporting of large deformation and constant resistance in the example is simple in structure, easy to process and simplifies operations of supporting and grouting and requires no grouting plug for sealing, simplifying the working procedures. The grouting anchor cable for supporting of large deformation and constant resistance in the example is particularly suitable for supporting of large deformation for surrounding rocks and generates a higher supporting strength. The internal loose structure of the surrounding rocks is changed by grouting to improve the self-bearing capability of the surrounding rocks, and large-deformation supporting of surrounding rocks is provided by constant resistance, and thus organic combination of "yielding-supporting" and "active and passive supporting" is achieved.

Of course, the above descriptions are not limiting of the present disclosure, and the present disclosure is not limited to the above examples. Any changes, modification, addition or substitutions made by those skilled in the art within the substantial scope of the present disclosure shall fall within the scope of protection of the present disclosure.

The invention claimed is:

1. A grouting anchor bolt for supporting of large deformation and constant resistance, comprising a casing, a hollow rod body, an anchor cylinder, a tray, a fastening nut and a clamping pin, wherein a front end of the casing is sealed and a rear end of the casing is open, a middle position of the casing is provided with a plurality of grouting holes, an inner diameter of the casing from the middle position of the casing to the rear end becomes small gradually, an inner wall from the middle position of the casing to the rear end is provided with a fine thread, a side surface of a front end of the hollow rod body is sleeved with the anchor cylinder, the front end of the hollow rod body is detachably connected with the anchor cylinder, the anchor cylinder is inserted into the casing and movably connected with the casing, the anchor cylinder is connected with the casing through the clamping pin, a rear end of the hollow rod body is sequentially assembled with the tray and the fastening nut.

2. The grouting anchor bolt for supporting of large deformation and constant resistance according to claim 1, wherein a front end thread of the hollow rod body is connected with the anchor cylinder.

3. The grouting anchor bolt for supporting of large deformation and constant resistance according to claim 1, wherein the front end of the casing is detachably provided with a baffle for sealing.

4. A quantitative roadway supporting method being applied to the grouting anchor bolt for supporting of large deformation and constant resistance according to claim 1 or a grouting anchor cable for supporting of large deformation and constant resistance, wherein the grouting anchor cable for supporting of large deformation and constant resistance comprises a casing, a steel cable, an anchor cylinder, a tray, a fastening nut and a clamping pin, a front end of the casing is sealed, a rear end of the casing is opened, a middle position of the casing is provided with a plurality of grouting holes, an inner diameter of the casing from the middle position of the casing to the rear end of the casing becomes small gradually, the steel cable is internally inserted with a hollow hose, a side surface of a front end of the steel cable is sleeved with the anchor cylinder, the anchor cylinder is inserted into the casing and movably connected with the casing, the anchor cylinder is connected with the casing through the clamping pin, and a rear end of the steel cable is sequentially assembled and connected with the tray and the fastening nut, and the quantitative roadway supporting method comprises:

at step 1, performing numerical simulation for a geological condition of a roadway, performing calculation analysis for a mining-induced stress distribution of surrounding rocks of roadway through the numerical simulation, drawing a mining-induced stress curve of roadway to obtain a roadway deformation amount $\Delta U$, performing quantitative determination for a length of an energy-absorbing region of the casing based on the roadway deformation amount $\Delta U$ no less than the length of the energy-absorbing region of the casing;

at step 2, selecting key points including a roadway wall 0, a virgin rock stress point a, a stress peak value b, a starting point d of a virgin rock stress according to the mining-induced stress curve of roadway and a virgin rock stress line of rock stratum, and continuing to subdivide other key points including ½ position e of an 0a curve, ½ position f of an ab curve, and ½ position c of a bd curve at the same time;

at step 3, allowing anchoring points of the grouting anchor bolt for supporting of large deformation and constant resistance or the grouting anchor cable for supporting of large deformation and constant resistance to be located at different key points based on the key points determined at step 2, so that a supporting length L of the grouting anchor bolt for supporting of large deformation and constant resistance or the grouting anchor cable for supporting of large deformation and constant resistance is determined, where the supporting length L is a distance between a key point and a roadway wall; performing calculating analysis for a maintenance effect of the roadway under different supporting lengths L based on numerical simulation to determine an optimal supporting length L;

at step 4, designing several groups of intervals of anchor bolts or anchor cables according to lithology of surrounding rocks of roadway and stipulations of a reinforced arch principle for an interval l≤0.5 L of anchor bolts or anchor cables and with reference to supporting experiences, and performing calculation analysis for maintenance effects of roadways with different intervals through numerical simulation to determine an optimal supporting interval; and at step 5, calculating a change curve of a deformation amount U of a roof, a floor, two sides of roadway after supporting along with an equivalent plastic strain through numerical simulation based on the lithology of surrounding rocks of roadway and the optimal supporting interval obtained at step 4, and determining quantification of a grouting time for the grouting anchor bolt for supporting of large deformation and constant resistance or the grouting anchor cable for supporting of large deformation and constant resistance after supporting according to the fact that the interval of the deformation amount of the roof, the floor, and the two sides of roadway is the optimal grouting and supporting time of roadway indicated by the roadway deformation amount when a maximum equivalent plastic strain $\varepsilon^{ps}$ of the surrounding rocks is located at the stage of $0.05 \leq \varepsilon^{ps} \leq 0.10$.

5. The quantitative roadway supporting method according to claim 4, wherein the inner wall from the middle position of the casing to the rear end of the casing of the grouting anchor cable for supporting of large deformation and constant resistance is provided with a fine thread.

6. The quantitative roadway supporting method according to claim 4, wherein the front end of the casing of the grouting anchor cable for supporting of large deformation and constant resistance is detachably provided with a baffle for sealing.

7. The quantitative roadway supporting method according to claim 4, wherein the steel cable of the grouting anchor cable for supporting of large deformation and constant resistance is formed by a plurality of steel strands surrounding the hollow hose through weaving.

* * * * *